(12) United States Patent
Lee (10) Patent No.: US 6,172,703 B1
(45) Date of Patent: Jan. 9, 2001

(54) VIDEO CONFERENCE SYSTEM AND CONTROL METHOD THEREOF

(75) Inventor: Sang-Jin Lee, Suwon (KR)

(73) Assignee: SamSung Electronics Co., Ltd., Suwon (KR)

( * ) Notice: Under 35 U.S.C. 154(b), the term of this patent shall be extended for 0 days.

(21) Appl. No.: 09/034,370

(22) Filed: Mar. 4, 1998

(30) Foreign Application Priority Data

Mar. 10, 1997 (KR) .................................................... 97-7959

(51) Int. Cl.$^7$ ...................................................... H04N 7/14
(52) U.S. Cl. ................................................. 348/15; 348/20
(58) Field of Search .............................. 348/14–20, 373, 348/836; 248/920–925; 379/202, 110.01; 709/204; 345/340, 342, 346, 330, 331–332

(56) References Cited

U.S. PATENT DOCUMENTS

| | | | |
|---|---|---|---|
| 5,318,257 | * | 6/1994 | Tani ......................................... 348/14 |
| 5,404,182 | * | 4/1995 | Nomura ................................. 248/920 |
| 5,557,663 | * | 9/1996 | Huang et al. .................... 379/110.01 |
| 5,612,733 | * | 3/1997 | Flohr ....................................... 348/20 |
| 5,815,197 | * | 9/1998 | Kakii ...................................... 348/20 |

\* cited by examiner

*Primary Examiner*—Curtis A. Kuntz
*Assistant Examiner*—George Eng
(74) *Attorney, Agent, or Firm*—Robert E. Bushnell, Esq.

(57) ABSTRACT

A video conference system and a control method thereof which allows conferencees to communicate by making eye contact with each other. The video conference system includes an input device for detecting images and outputting a first video signal, the input device being adjustable to align it to the line of vision of a user. A main frame receives the first video signal and transmits it to a computer on the other end of a network, and receives a second video signal from the computer on the other end and outputs a video control signal to enable reproduction of the second video signal. A monitor receives the video control signal and reproduces images corresponding to the second video signal on a display area of the monitor not blocked by the input device.

15 Claims, 8 Drawing Sheets

VIDEO CONFERENCE SYSTEM AND CONTROL METHOD THEREOF

BACKGROUND OF THE INVENTION (a) Field of the Invention

The present invention relates to a video conference system and control method thereof and, more particularly, to a video conference system and control method thereof which allows conferencees to communicate by making eye contact with each other.

(b) Description of the Related Art

In today's technological society, computers have become as an essential office machine. Although at first it has been used only for word processing and data management, it is now being used more and more as a communication medium. Computers were first used merely to send and receive email. Recently, they have been used as Internet phone. Now, video conference using computers is predicted to be the next revolutionary use of computers.

Figure 11:
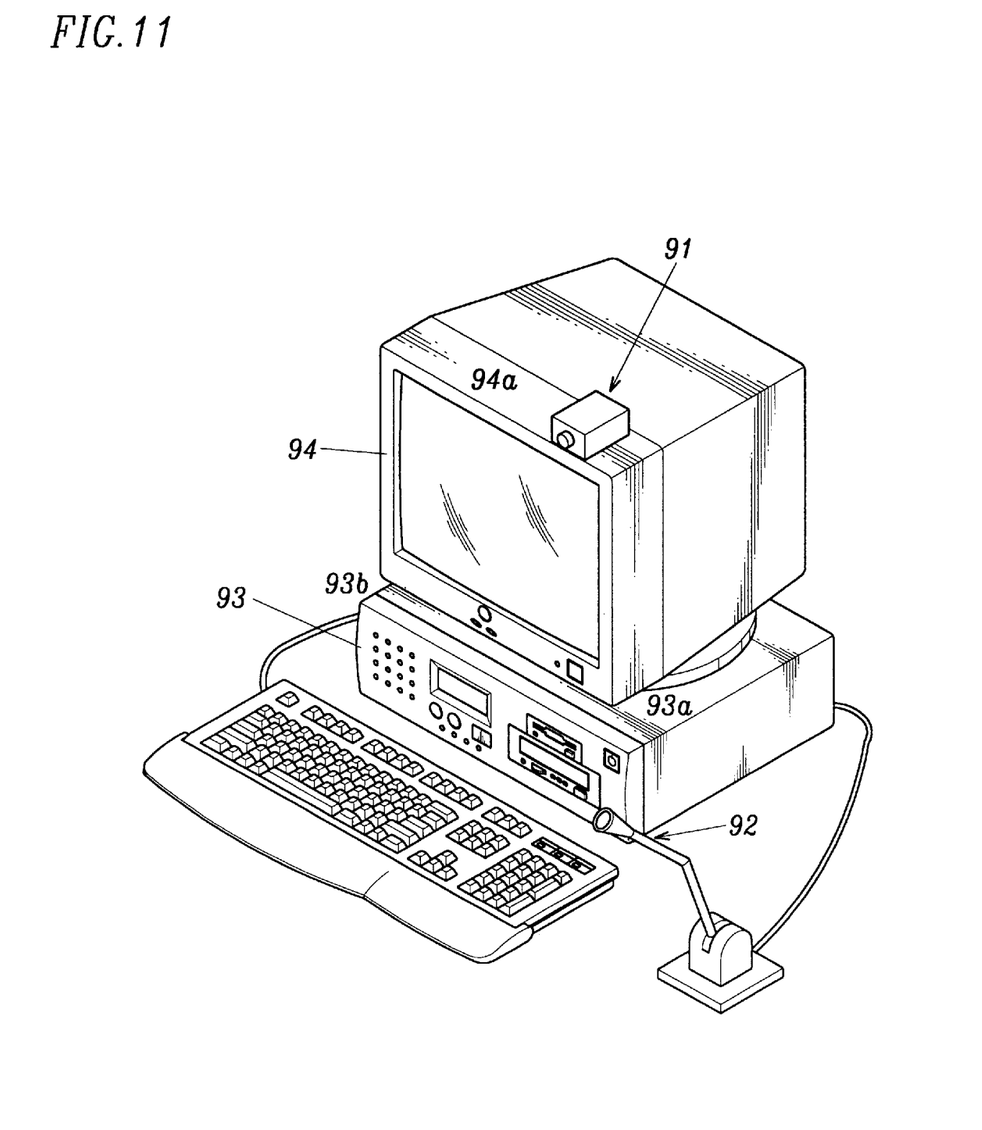
FIG. 11 is a video conference system.
Figure 12:
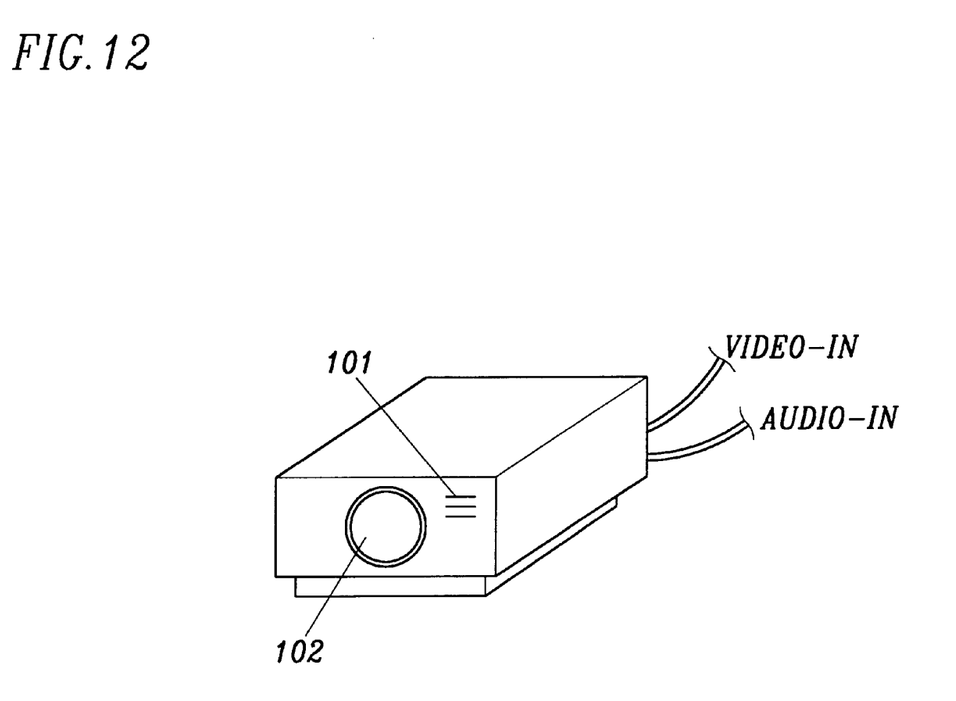
FIG. 12 is an input device having camera and microphone.
Figure 13:
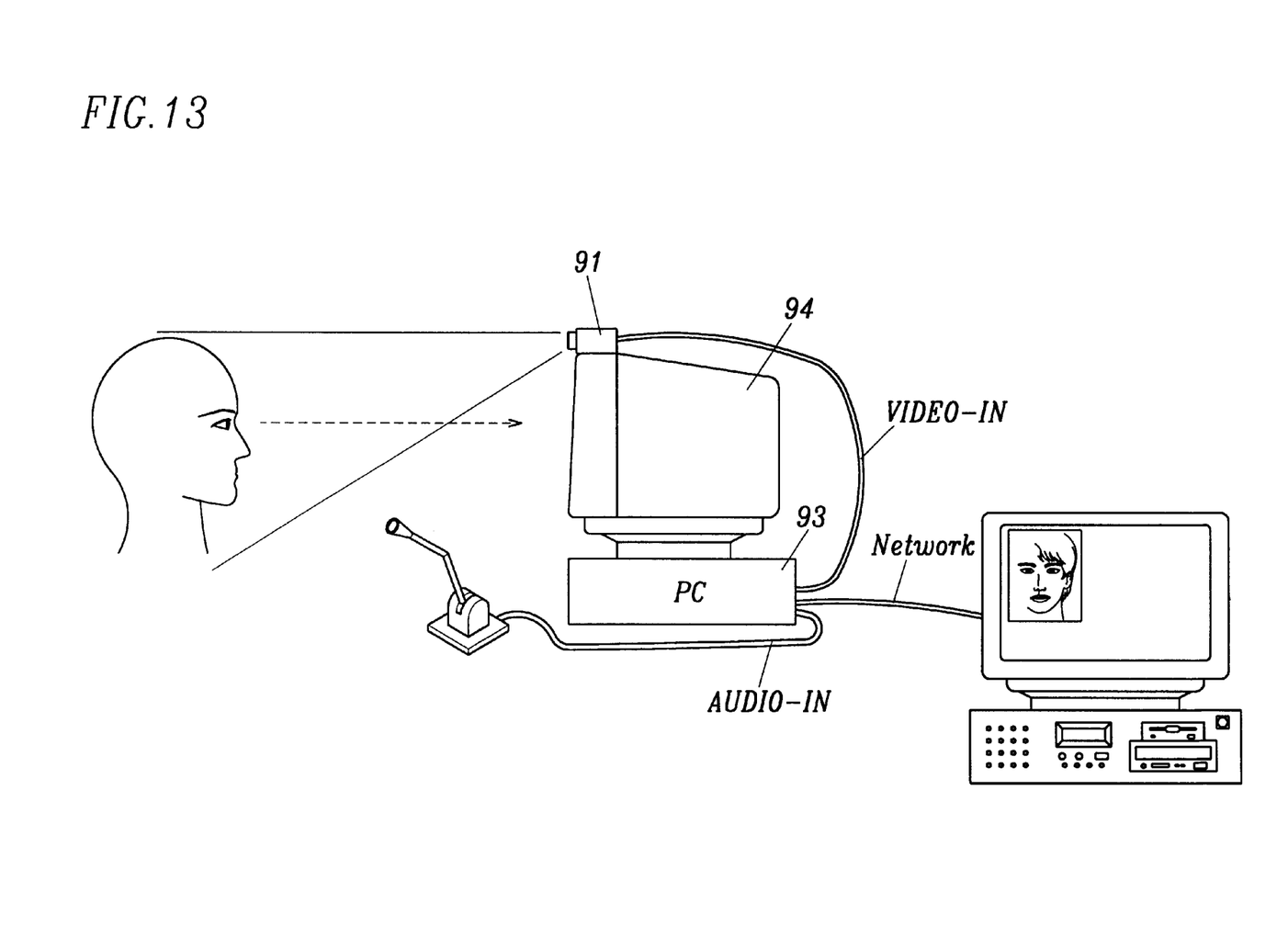
FIG. 13 illustrates use of the video conference system of FIG. 11.

A video conference system is shown in FIG. 11. The system has a camera 91 placed on top 94a of a monitor 94. The camera 91 may also be placed on top-right 93a of a main frame 93 or top-left 93b of the main frame 93. A microphone 92 is usually placed on the right side of the main frame 93. The video conference system may also use an input device which includes both a microphone 101 and a camera lens 102, whereby a video signal and an audio signal are output together by the input device.

In the video conference system, the camera 91 is placed above, on the monitor 94, or below, on the main frame 93, of the line of vision of a user. Therefore, a person on the other end would see the user's image which is looking down or up and not making eye contact with the person. As a result, video conferencees would feel that their counterparts are talking to someone else and not to them.

SUMMARY OF THE INVENTION

A primary object of the present invention is to solve the problems associated with the above-referenced related art.

It is another object to provide an improved video conference system.

It is still another object to provide a video conference system which provides realistic feel of communication between video conferencees by allowing them to make eye contact.

A video conference system constructed as an embodiment of the present invention include an input device for detecting images and outputting a first video signal, the input device being adjustable to align it to the line of vision of a user; a main frame for transmitting the first video signal output by the input device to a computer on the other end, and for receiving a second video signal from the computer on the other end and outputting a video control signal to enable reproduction of the second video signal; and a monitor for receiving the video control signal of the main frame and reproducing images corresponding to the second video signal on its display area.

According to anther aspect of the present invention, a video conference system includes a stand-type input device for detecting images and outputting a first video signal, the stand-type input device which may be moved to align it to the line of vision of a user; a main frame for transmitting the first video signal output by the input device to a computer on the other end, and for receiving a second video signal from the computer on the other end and outputting a video control signal to enable reproduction of the second video signal; and a monitor for receiving the video control signal of the main frame and reproducing images corresponding to the second video signal on a display area of the monitor not blocked by the stand-type input device.

According to yet another aspect of the present invention, a video conference system includes a retractable input device for detecting images and outputting a first video sign, the retractable input device whose length may be adjusted to align it to the line of vision of a user; a main frame for transmitting the first video signal output by the input device to a computer on the other end, and for receiving a second video signal from the computer on the other end and outputting a video control signal to enable reproduction of the second video signal; and a monitor for receiving the video control signal of the main frame and reproducing images corresponding to the second video signal on its display area.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE PREFERRED EMBODIMENTS

Figure 1:
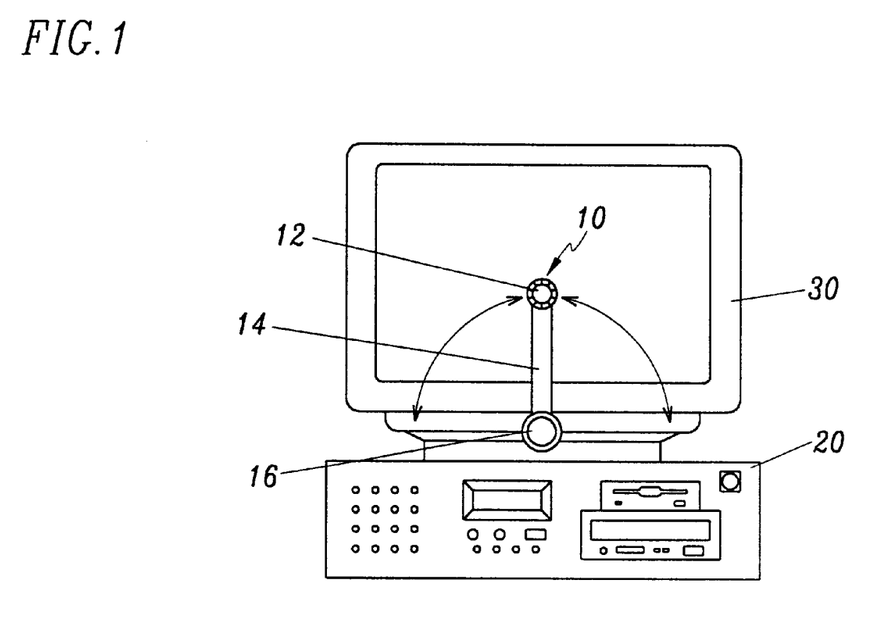
FIG. 1 a schematic diagram of an input device of a video conference system according to the principles of the present invention.

Turning now to the drawing, FIG. 1 shows a schematic diagram of a video conference system according to the present invention. The video conference system includes an input device 10 for detecting sounds and images and outputting first audio and video signals, the input device being adjustable to align it to the line of vision of a user; a main frame 20 or main unit 20 for transmitting the first audio and video signals output by the input device 10 to a computer on the other end of a network, and for receiving second audio and video signals from the computer on the other end and outputting a control signal to enable reproduction of the second audio and video signals; and a monitor 30 for receiving the control signal of the main frame 20 and reproducing images corresponding to the second video signal on a display area of the monitor 30 which is not blocked by the input device 10. The main frame 20 may include a speaker for reproducing the second audio signal.

Figure 2:
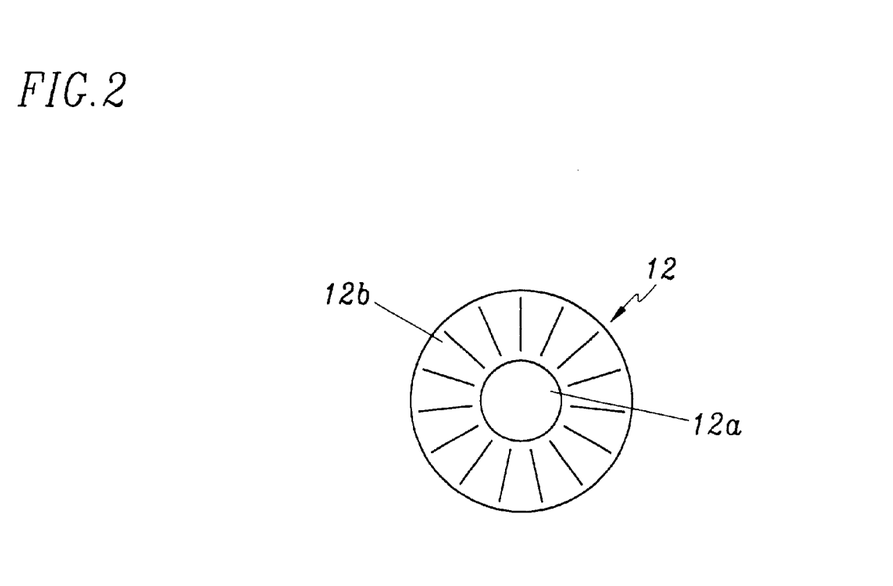
FIG. 2 is an enlarged view of an input part of the input device in FIG. 1.

The input device 10 includes an input part 12, an arm 14 and a support 16. The input part 12 is connected to an end of the arm 14, and the support 16 is connected to an opposing end of the arm 14. FIG. 2 shows an enlarged view of the input part 12 of the input device 10. The input part 12 has a camera lens 12a for detecting images and a microphone 12b for detecting sounds.

The support 16 of the input device 10 may be constructed in various different shapes or ways for purposes of working the present invention. The support 16 may include a rotator connected to the arm 14 and a stationary body. The arm 14 is adjusted to a desired position by rotating the rotator. The support 16 may be constructed to allow maximum of 90-degree rotation of the arm 14 as in FIG. 3, or allow maximum of 180-degree rotation of the arm 14 as in FIG. 4.

Figure 3:
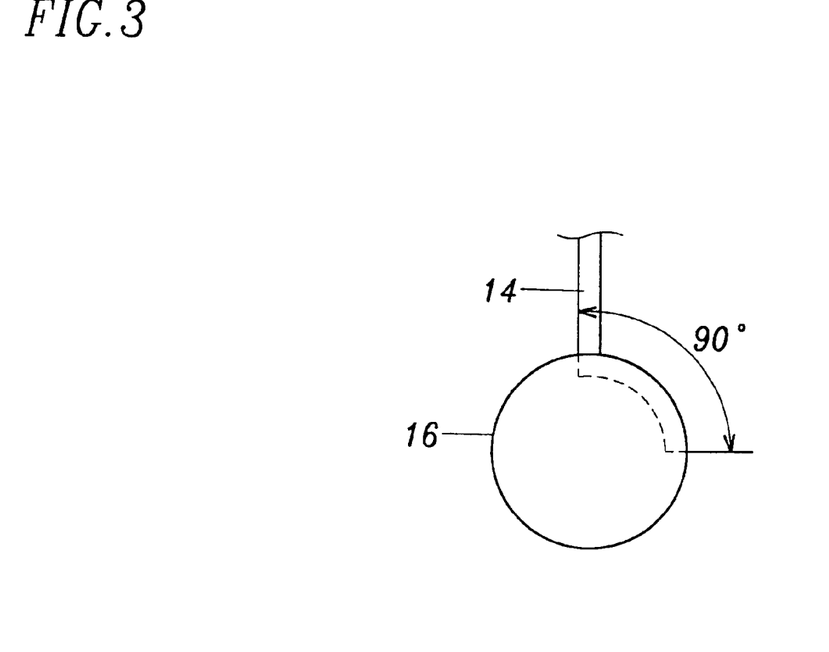
FIGS. 3–5 are schematic diagrams of a support of the input device in FIG. 1.
Figure 4:
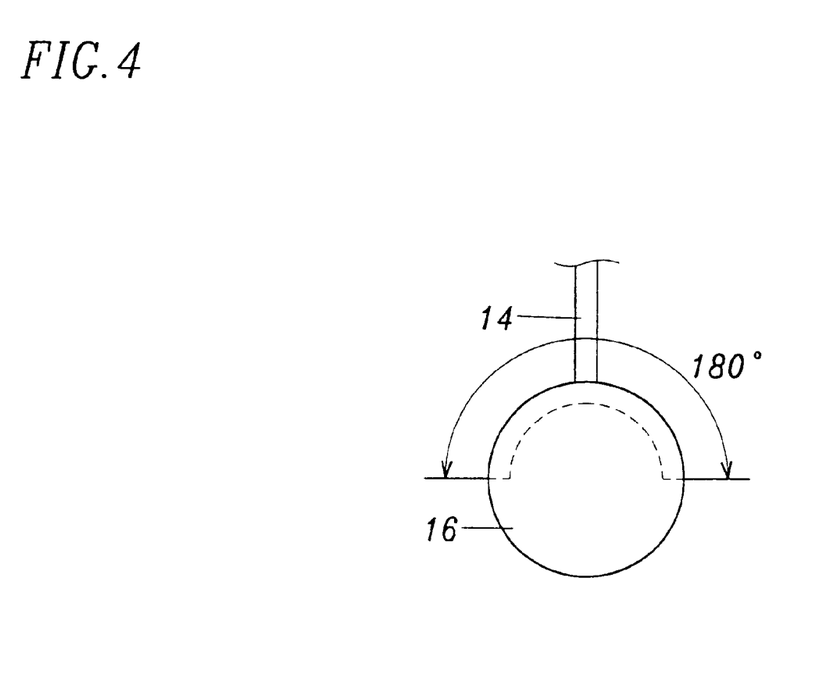

The arm 14 is securely held at the desired position by using friction force between the rotator and the stationary body. Although the support 16 is described to have both the rotator and the stationary body, it is possible for the support 16 to include the rotator and not the stationary body since a face of the main frame 20 or the monitor 30 may serve the functions of the stationary body, whereby necessary frictional force is produced between the rotator and the face of the main frame 20 or the monitor 30 to securely hold the arm 14 in a desired position.

Figure 5:
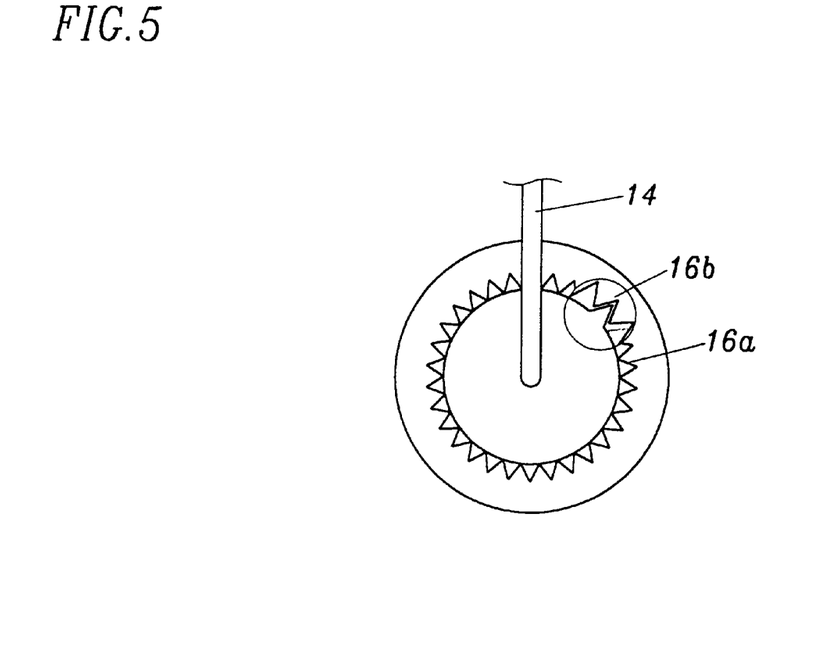

The support 16 may also include a gear 16a with a plurality of teeth and a clutch 16b for locking on to one of the teeth of the gear 16a as shown in FIG. 5. The gear 16a is connected to the arm 14, and the arm 14 may be adjusted to a desired position by rotating the gear 16a. The arm 14 is securely held at the desired position by locking of the clutch 16b to the tooth of the gear 16a. The gear 16a or the clutch 16b is constructed of elastic material in order to enable rotation of the gear 16a.

Above methods are illustrated merely as examples of various methods that can be used to adjust the position of the input device 10 and securely hold it at the desired position according to an embodiment of the present invention. Other methods may be used for purposes of working the present invention.

An illustrative example of the operation of the video conference system according to the present invention is described below. The input device 10 of the video conference system is activated when a user applies power to the video conference system. The user then rotates the arm 14 of the input device 10 to a position where the input part 12 is aligned to the line of vision of the user as in FIG. 6. The user proceeds to communicate with the other video conferencees.

Figure 6:
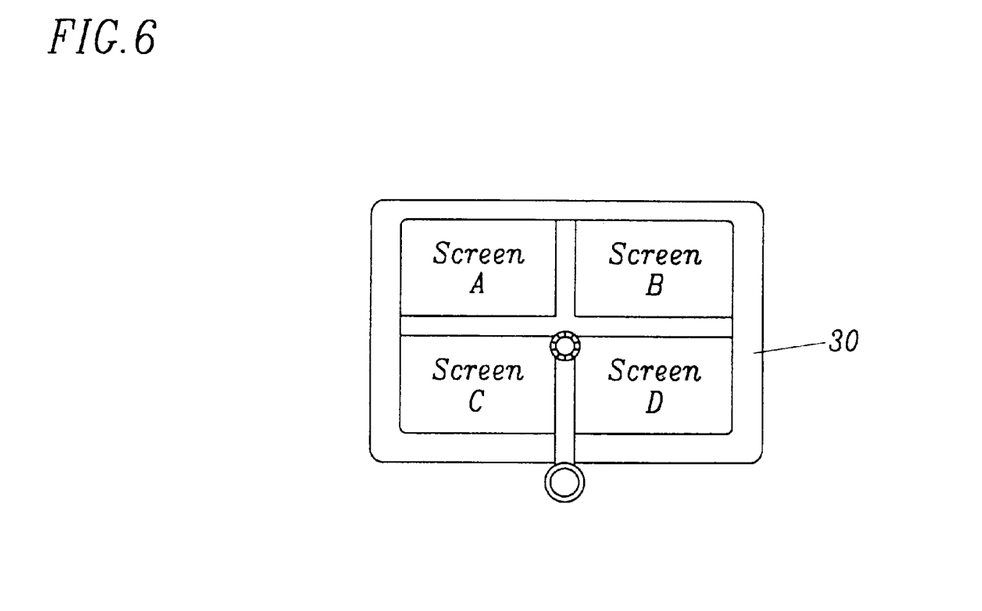
FIG. 6 illustrates a position of the input device and a display state of the monitor when the input device is in use and aligned to the line of vision of a user during video conference.

The input device 10 detects sounds and images of the user through the camera lens 12a and the microphone 12b and outputs audio and video signals to the main frame 20. The main frame 20 transmits the audio and video signals to computers of the other video conferencees, and image and voice of the user are reproduced by the computers of the video conferencees On the other hand, the main frame 20 of the user receives audio and video signals transmitted by the computers of the video conferencees and reproduces images corresponding to the video signal on the display area of the monitor 30 and outputs sounds corresponding to the audio signal through the speaker of the main frame 20. Images reproduced according to the video signal received from the computers of the other video conferencees are displayed on a display area of the monitor 30 which is not blocked by the input device 10 as shown in FIG. 6. A user can view the entirety of the images at screens A, B, C, and D without the user needing to change position, as shown in FIG. 6.

The images of video conferencees reproduced according to the present invention make eye contact with each other because the camera lens 12a of the input part 12 is aligned to the line of vision of the video conferencees, unlike in the video conference system of the related art.

Figure 7:
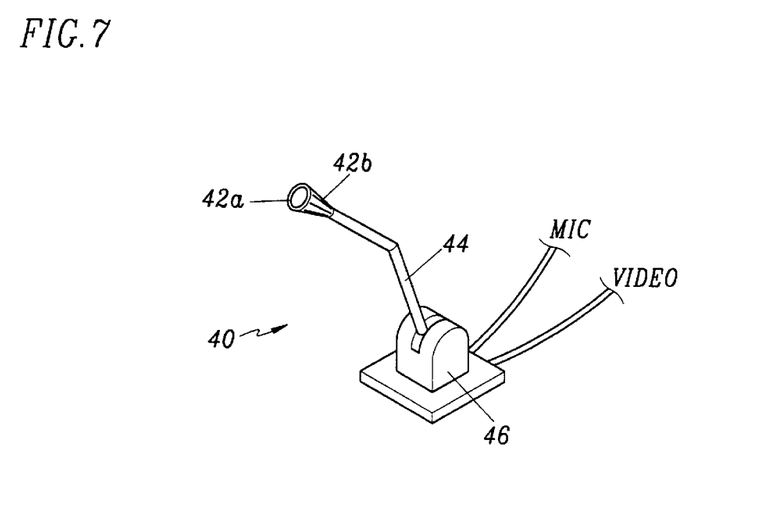
FIG. 7 shows a stand-type input device of a video conference system according to the principles of the present invention.
Figure 8:
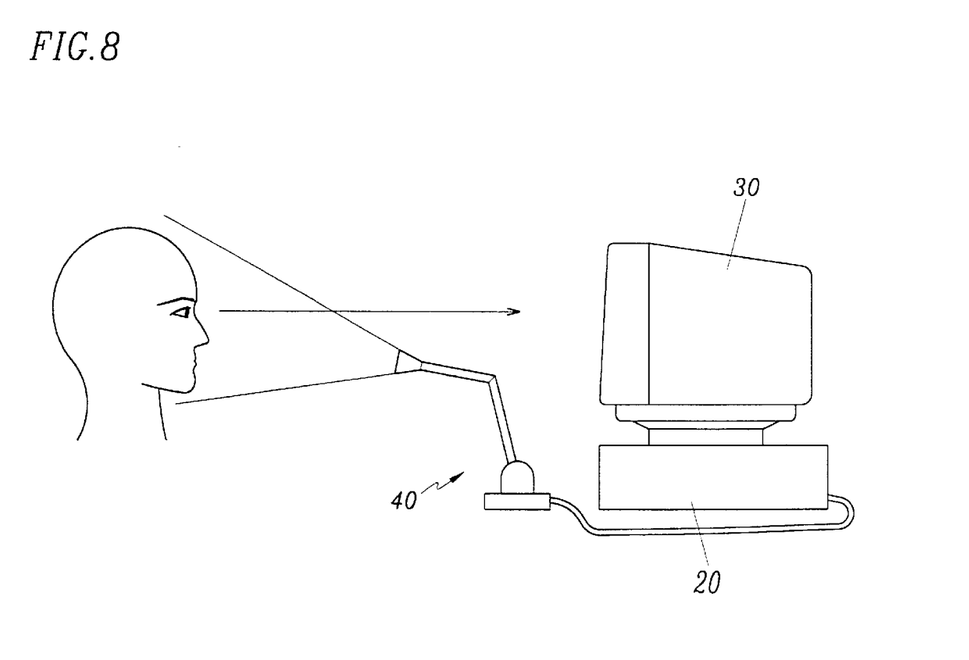
FIG. 8 illustrates the position of the stand-type input device when it is in use and aligned to the line of vision of a user during video conference.

A second embodiment of the present invention is shown in FIGS. 7 and 8. The video conference system includes a stand-type input device 40 for detecting sounds and images and outputting audio and video signals, wherein the stand-type input device 40 is movable to align it to the line of vision of a user; a main frame 20 for transmitting the first audio and video signals output by the stand-type input device 40 to a computer on the other end of a network, and for receiving second audio and video signals from the computer on the other end and outputting a control signal to enable reproduction of the second audio and video signals; and a monitor 30 for receiving the control signal of the main frame 20 and reproducing images corresponding to the second video signal on a display area of the monitor 30 which is not blocked by the stand-type input device 40. The main frame 20 may include a speaker for reproducing the second audio signal. FIG. 8 shows the stand-type input device 40 positioned to be aligned to the line of vision of a user. The aforementioned network can correspond to a computer network wherein a plurality of computers are interconnected.

An illustrative example of the operation of the video conference system according to the second embodiment of the present invention is described below. A user places the stand-type input device 40 in the line of vision and applies power to the video conference system and activates the stand-type input device 40. The user proceeds to communicate with other video conferencees.

The stand-type input device 40 detects voice and image of the user and output audio and video signals to the main frame 20. The main frame 20 transmits the audio and video signals to computers on the other end of a network, and image and voice of the user are reproduced by the computers on the other end.

On the other hand, the main frame 20 of the user receives audio and video signals transmitted by the computers of the video conferencees and reproduces images corresponding to the video signal on received from the computers on the other end on the monitor 30 and output sounds corresponding to the audio signal received from the computers on other end through the speaker of the main frame 20. The images of video conferencees are displayed on the display area of the monitor 30 which is not blocked by the stand-type input device 40. Therefore, the user may view images of other video conferencees in their entirety. The stand-type input device 40 includes a camera 42a, a microphone 42b, an arm 44, and a base 46, as shown in FIG. 7.

The images of video conferencees reproduced according to the present invention appear to be making eye contact with each other because the camera lens 42a of the input device 40 is aligned to the line of vision of the video conferencees, unlike in the video conference system of the related art.

Figure 9:
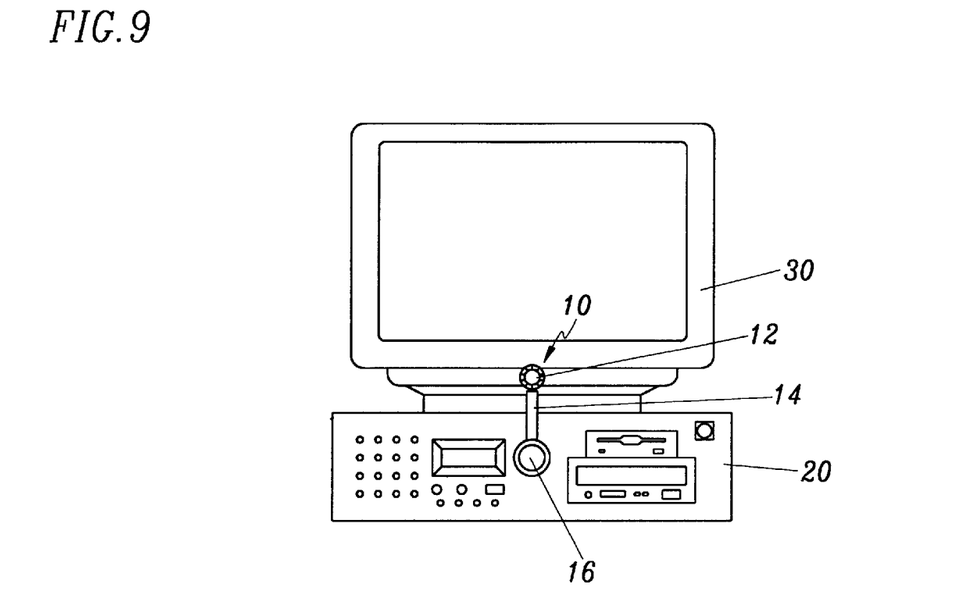
FIG. 9 shows a retractable input device for a video conference system in a retracted state when it is not in use according to the principles of the present invention.
Figure 10:
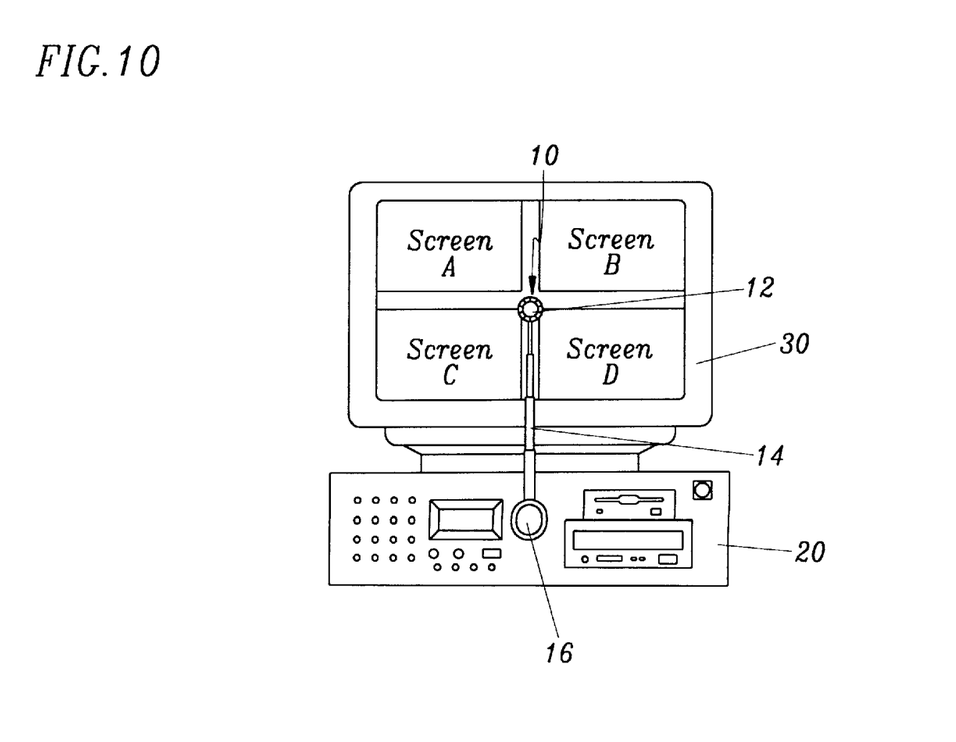
FIG. 10 shows the retractable input device of FIG. 9 in a pulled-out state to be aligned to the line of vision of a user when in use according to the principles of the present invention.

A third embodiment of the present invention is shown in FIGS. 9 and 10. The video conference system includes an input device 10 for detecting sounds and images and outputting first audio and video signals, the input device whose length is adjustable to align it to the line of vision of a user when in use; a main frame 20 for transmitting the first audio and video signals output by the input device 10 to a computer on the other end of a network, and for receiving second audio and video signals from the computer on the other end and outputting a control signal to enable reproduction of the second audio and video signals; and a monitor 30 for receiving the control signal of the main frame 20 and reproducing images corresponding to the second video signal on a display area of the monitor which is not blocked by the input device. The main frame 20 may include a speaker for reproducing the second audio signal.

The input device 10 includes an input part 12, an arm 14 and a support 16. The input part 12 is connected to an end of the arm, and the support 16 is connected to an opposing end of the arm 14. FIG. 2 shows an enlarged view of the input part 12 of the input device 10. The input part 12 has a camera lens 12a for detecting images and a microphone 12b for detecting sounds. The support 16 is securely affixed to a face of the main frame 20, but it may be affixed to a face of the monitor 30 for purposes of working the present invention.

The arm 14 having its ends connected to the input part 12 and the support 16 may be pulled out or pushed in to adjust the length of the arm 14. The arm 14 may be pulled out to a desired length to align the input part 12 to the line of vision of the user when the video conference system is in use. FIG. 10 shows the video conference system in use where the arm 14 is pulled out or extended to align the input part 12 to the line of vision of the user. Images are reproduced on display areas of the monitor 30 not blocked by the input device 10. In other words, images at screens A, B, C, and D are reproduced on monitor 30 where the line of vision of the user is not blocked by input device 10, as shown in FIG. 10. As illustrated in FIG. 10, it is apparent that a user can view the images at screens A, B, C, and D substantially simultaneously utilizing direct vision or peripheral vision or both, because the screens are adjacent to one another.

The operation of the video conference system according to the third embodiment is substantially similar to that of the first and second embodiments, and an illustrative example of the operation of the third embodiment is omitted here to avoid redundancy.

It should be noted that although the input device 10 is described above as detecting both sounds and images and outputting both audio and video signals in the above-described embodiments of the present invention, it is possible to use the input device 10 which detects only images and outputs only video signals for purposes of working the present invention.

What is claimed is:

1. A video conference system, comprising:
an input device detecting images and outputting a first video signal, said input device being movable to a location aligned with a line of vision of a user;
a main unit transmitting said first video signal output by said input device to a first computer, receiving a second video signal transmitted by the first computer, outputting a first video control signal controlling reproduction of said second video signal, the first computer being separately located from said main unit;
a monitor receiving said video control signal of said main unit, said monitor reproducing first images at a first site on said monitor where the line of vision of the user is not blocked by said input device, said first site corresponding to a place where the user can view the entirety of said first site without the user needing to change a position of the user, the first images corresponding to said second video signal;
said main unit receiving a third video signal transmitted by a second computer, the second computer being separately located from said main unit and from the first computer;
said monitor reproducing second images at a second site on said monitor where the line of vision of the user is not blocked by said input device, said second site corresponding to a place where the user can view the entirety of said second site without the user needing to change a position of the user the second images corresponding to said third video signal;
said first and second sites being spaced apart allowing the user to view the entirety of said first and second sites substantially simultaneously;
said input device comprising:
an input part detecting images;
an arm having a first end and a second end, said first end being connected to said input part;
a support being attached to said main unit and being connected to said second end of said arm; and
a microphone on said input part detecting sounds and outputting a first audio signal together with said first video signal.

2. A video conference system, comprising:
an input device detecting images and outputting a first video signal, said input device being movable to a location aligned with a line of vision of a user;
a main unit transmitting said first video signal output by said input device to a first computer, receiving a second video signal transmitted by the first computer, outputting a first video control signal controlling reproduction of said second video signal, the first computer being separately located from said main unit;
a monitor receiving said video control signal of said main unit, said monitor reproducing first images at a first site on said monitor where the line of vision of the user is not blocked by said input device, said first site corresponding to a place where the user can view the entirety of said first site without the user needing to change a position of the user, the first images corresponding to said second video signal;
said main unit receiving a third video signal transmitted by a second computer, the second computer being separately located from said main unit and from the first computer;
said monitor reproducing second images at a second site on said monitor where the line of vision of the user is not blocked by said input device, said second site corresponding to a place where the user can view the entirety of said second site without the user needing to change a position of the user, the second images corresponding to said third video signal; and
said first and second sites being spaced apart allowing the user to view the entirety of said first and second sites substantially simultaneously.

3. A video conference system, comprising:
an input device detecting images and outputting a first video signal, said input device being movable to a location aligned with a line of vision of a user;
a main unit transmitting said first video signal output by said input device to a first computer, receiving a second video signal transmitted by the first computer, outputting a first video control signal controlling reproduction of said second video signal, the first computer being separately located from said main unit;
a monitor receiving said video control signal of said main unit, said monitor reproducing first images at a first site on said monitor where the line of vision of the user is not blocked by said input device, said first site corresponding to a place where the user can view the entirety of said first site without the user needing to change a position of the user, the first images corresponding to said second video signal;
said main unit receiving a third video signal transmitted by a second computer, the second computer being separately located from said main unit and from the first computer;
said monitor reproducing second images at a second site on said monitor where the line of vision of the user is not blocked by said input device, said second site corresponding to a place where the user can view the entirety of said second site without the user needing to change a position of the user, the second images corresponding to said third video signal;
said first and second sites being spaced apart allowing the user to view the entirety of said first and second sites substantially simultaneously;
said input device comprising:
  an input part detecting images;
  an arm being connected to said input part and being attached to said main unit; and
  a microphone on said input part detecting sounds and outputting a first audio signal together with said first video signal.

4. The system of claim 1, said support comprising:
a rotator connected to said arm, said rotator rotating to adjust position of said arm; and
a stationary body contacting said rotator, said rotator and said stationary body having a frictional force therebetween used to securely hold said arm at a selected position.

5. The system of claim 1, said support comprising a rotator adjusting position of said arm by rotating said rotator, said rotator being connected to said arm and contacting said main unit, said rotator and said main unit having a frictional force therebetween used to securely hold said arm at a selected position.

6. The system of claim 1, said support comprising:
a gear having a plurality of teeth and being connected to said arm, a position of said arm being adjusted by rotating said gear in a first plane substantially parallel to a second plane of a face of said monitor; and
a clutch locking at least one of said plurality of teeth of said gear to securely hold said arm at a selected position.

7. The system of claim 6, said gear being constructed of elastic material to enable rotation of said gear.

8. A video conference system, comprising:
a stand-type input device detecting images and outputting a first video signal, said stand-type input device being movable to a location in front of a monitor to align said stand-type input device with a line of vision of a user;
a main unit transmitting said first video signal output by said input device to a first computer, receiving a second video signal transmitted by the first computer, outputting a first video control signal enabling reproduction of said second video signal, the first computer being separately located from said main unit;
said monitor receiving said first video control signal of said main unit, said monitor reproducing first images at a first site on a display area of said monitor where the line of vision of the user is not blocked by said input device, said first site corresponding to a place where the user can view the entirety of said first site without the user needing to change a position of the user, the first images corresponding to said second video signal;
said main unit receiving a third video signal transmitted by a second computer, the second computer being separately located from said main unit and from the first computer;
said monitor reproducing second images at a second site on said monitor where the line of vision of the user is not blocked by said input device, said second site corresponding to a place where the user can view the entirety of said second site without the user needing to change a position of the user, the second images corresponding to said third video signal; and
said first and second sites being spaced apart allowing the user to view the entirety of said first and second sites substantially simultaneously.

9. The system of claim 8, said input device further comprising a microphone detecting sounds and outputting a first audio signal together with said first video signal.

10. A video conference system, comprising:
a retractable input device detecting images and outputting a first video signal, said input device being extendable to a location aligned with a line of vision of a user;
a main unit transmitting said first video signal output by said input device to a first computer, receiving a second video signal transmitted by the first computer, outputting a first video control signal enabling reproduction of said second video signal, the first computer bing separately located from said main unit;
a monitor receiving said first video control signal of said main unit, said monitor reproducing first images at a first site on said monitor where the line of vision of the user is not blocked by said input device, said first site corresponding to a place where the user can view the entirety of said first site without the user needing to change a position of the user, the first images corresponding to the second video signal;
said main unit receiving a third video signal transmitted by a second computer, the second computer being separately located from said main unit and from the first computer;
said monitor reproducing second images at a second site on said monitor where the line of vision of the user is not blocked by said input device, said second site corresponding to a place where the user can view the entirety of said second site without the user needing to change a position of the user, the second images corresponding to said third video signal; and
said first and second sites being spaced apart allowing the user to view the entirety of said first and second sites substantially simultaneously.

11. The system of claim 10, further comprising:

said main unit receiving fourth and fifth video signals transmitted by third and fourth computers respectively, the third and fourth computers being separately located from said main unit and from the first and second computers; and said monitor reproducing additional images at third and fourth sites on said monitor where the line of vision of the user is not blocked by said input device, said third and fourth sites corresponding to places where the user can view the entirety of said third and fourth sites without the user needing to change a position of the user, said third and fourth sites on said monitor being spaced apart to allow the user to view images at said first, second, third, and fourth sites substantially simultaneously, the additional images corresponding to said fourth and fifth video signals.

12. The system of claim 10, said input device comprising:

an input part detecting images;

an arm having a first end and a second end, said first end being connected to said input part, said arm being extendable to a location aligned with the line of vision of the user; and a support being attached to said main unit and being connected to said second end of said arm.

13. The system of claim 12, said input device further comprising a microphone on said input part detecting sounds and outputting a first audio signal together with said first video signal.

14. The system of claim 10, said input device comprising:

an input part detecting images;

an arm having a first end and a second end, said first end being connected to said input part, said arm being extendable to a location aligned with the line of vision of the user; and a support being attached to a face of said monitor and being connected to said second end of said arm.

15. A video conference system control method, comprising:

adjusting an input device to align it with a line of vision of a user;

detecting images and outputting a first video signal;

transmitting said first video signal output by said input device to a first computer, said transmitting being performed by a main unit coupled to said input device, the first computer being separately located from said main unit;

receiving a second video signal transmitted by the first computer, outputting a first video control signal controlling reproduction of said second video signal;

receiving said first video control signal, reproducing first images at a first site on a monitor where the line of vision of the user is not blocked by said input device, said first site corresponding to a place where the user can view the entirety of said first site without the user needing to change a position of the user, the first images corresponding to said second video signal;

receiving a third video signal transmitted by a second computer, the second computer being separately located from said main unit and from the first computer;

reproducing second images at a second site on the monitor where the line of vision of the user is not blocked by said input device, said second site corresponding to a place where the user can view the entirety of said second site without the user needing to change a position of the user, the second images corresponding to said third video signal, said first and second sites being spaced apart allowing the user to view the entirety of said first and second sites substantially simultaneously;

receiving fourth video signals transmitted by a third computer, the third computer being separately located from said main unit and from the first and second computers; and said monitor reproducing additional images at a third site on said monitor where the line of vision of the user is not blocked by said input device, said third site corresponding to a place where the user can view the entirety of said third site without the user needing to change a position of the user, said first, second, and third sites on said monitor being spaced apart to allow the user to view said first, second, and third sites substantially simultaneously, the additional images corresponding to said fourth video signals.

* * * * *